United States Patent [19]
Fluck

[11] Patent Number: 4,462,522
[45] Date of Patent: Jul. 31, 1984

[54] VIBRATORY CONVEYOR

[75] Inventor: René Fluck, Schleitheim, Switzerland

[73] Assignee: SIG - Schweizerische Industrie-Gesellschaft, Neuhausen am Rheinfall, Switzerland

[21] Appl. No.: 360,172

[22] Filed: Mar. 19, 1982

[30] Foreign Application Priority Data

Apr. 3, 1981 [CH] Switzerland ............. 2294/81

[51] Int. Cl.$^3$ ........................... B65G 27/18
[52] U.S. Cl. ....................... 198/766; 74/26; 198/570
[58] Field of Search ............ 198/570, 575, 609, 760, 198/766; 74/26, 47

[56] References Cited
U.S. PATENT DOCUMENTS

| 848,670 | 4/1907 | Meyer | 74/26 X |
|---|---|---|---|
| 1,214,506 | 2/1917 | Brasack | 198/609 X |
| 2,756,973 | 7/1956 | Dostatni | 74/26 |
| 3,028,947 | 4/1962 | Robertson | 198/609 X |

FOREIGN PATENT DOCUMENTS
313894 6/1956 Switzerland .

Primary Examiner—Jeffrey V. Nase
Attorney, Agent, or Firm—Spencer & Frank

[57] ABSTRACT

A vibratory conveyor composed of a plurality of parallel vibratory conveying troughs for transporting fragile articles, the troughs being driven by a conveyor drive composed of a rotatable drive shaft and at least one group of at least four drive elements each connected to undergo oscillatory movement in response to rotation of the drive shaft. Each trough is connected to a respective drive element to undergo vibratory movement in response to rotation of the drive shaft. The drive elements of the group are arranged in two equal subgroups bearing a mirror image configuration to one another relative to a plane normal to the axis of rotation of the drive shaft, and the drive elements of each subgroup are connected to the drive shaft in such a manner that their respective oscillatory movements are uniformly offset in phase from one another.

8 Claims, 3 Drawing Figures

U.S. Patent　　　Jul. 31, 1984　　　4,462,522
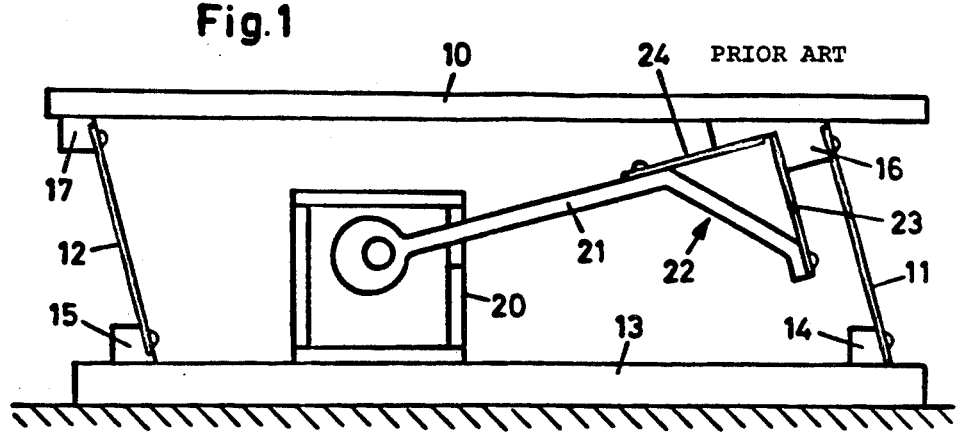
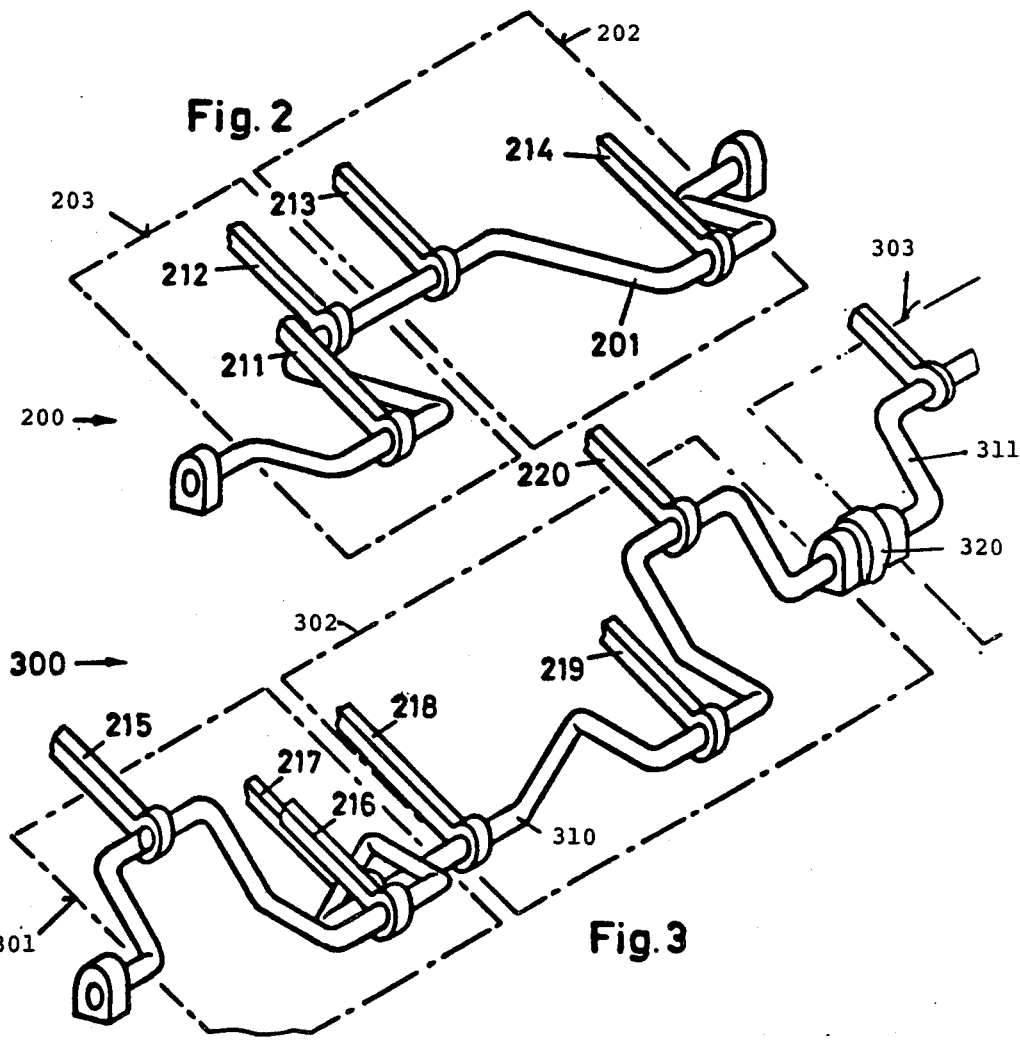

VIBRATORY CONVEYOR

BACKGROUND OF THE INVENTION

The present invention relates to a vibratory conveyor of the type composed of a group of parallel vibratory members.

Vibratory conveyors, also called vibrators or vanners, are well known in the conveying art. Such a vibratory processing machine is disclosed, for example, in Swiss Auslegeschrift [Published Patent Application] No. 313,894. In this machine, two superposed members are vibrated in opposition to one another by a common drive means. In order to extend the conveying distance, lateral carriers are employed for the members receiving the material to be worked on and the lateral carriers, which are arranged above one another, are connected together via springs to form a vibratory unit.

When baked goods, such as fresh cookies or entire packages of such cookies, are transported it is known to drive the conveying troughs by means of crank mechanisms. As is known, cookies are cut and baked in a continuous process and therefore are present on a wide path. Before these cookies are counted and stacked for packaging, they are cooled, and possibly provided with a coating. Known vibratory troughs have been found to be quite satisfactory as conveying means. They present the drawbacks, however, that they transmit vibratory energy to the environment, with attendant noise development, and increased maintenance due to friction losses.

SUMMARY OF THE INVENTION

It is therefore an object of the present invention to provide a vibratory conveyor which does not have these drawbacks.

The above and other objects are achieved, according to the invention, in a vibratory conveyor composed of a plurality of parallel vibratory conveying troughs for transporting fragile articles, by the provision of conveyor drive means composed of a rotatable drive shaft and at least one group of at least four drive elements each connected to undergo oscillatory movement in response to rotation of the drive shaft, with each trough being connected to a respective drive element to undergo vibratory movement in response to rotation of the drive shaft, with the drive elements of the group being arranged in two equal subgroups bearing a mirror image configuration to one another relative to a plane normal to the axis of rotation of the drive shaft, and with the drive elements of each subgroup being connected to the drive shaft in such a manner that their respective oscillatory movements are uniformly offset in phase from one another.

Embodiments of the invention will now be described in greater detail with reference to the drawing figures.

BRIEF DESCRIPTION OF THE DRAWING

FIG. 1 is a front elevational view, in schematic form, of a vibratory conveyor.

FIG. 2 is a perspective view of a drive system according to the invention for a vibratory conveyor having four conveying troughs.

FIG. 3 is a view similar to that of FIG. 2 for a vibratory conveyor having six conveying troughs.

DESCRIPTION OF THE PREFERRED EMBODIMENTS

FIG. 1 shows an apparatus including a conveying trough 10 supported by two supports 11, 12. These supports 11, 12 are spring elastic elements which are fastened on a stationary base 13, each support being mounted on a respective mounting element 14 or 15 and being fastened to the conveying trough 10 at a respective like mounting element 16 or 17. A drive 20, for example, an eccentric drive, drives a connecting rod 21 whose free end is fastened in an elastically articulated manner to the conveying trough 10 via a hinge 22. In FIG. 1 the hinge 22 is formed of two mutually perpendicularly oriented hinge springs 23 and 24 each having one end rigidly connected with the connecting rod 21 and its other end rigidly fixed to a mounting element. The mounting element 16 of this embodiment is simultaneously the mounting element for the hinge springs 23 and 24.

As is well known in the art, such an arrangement forms a vibratory system which, however, transfers considerable vibratory energy through the base 13 to the ground and thus produces undesirable vibrations.

Instead of supports made of leaf spring steel, use can be made of rigid supports, which are anchored in elastic pivot bearings. A combination of such elements is also conceivable, wherein, advantageously, the supports 11 and 12 may be made of leaf spring steel and the articulated connection between connecting rod and conveying trough may be an elastic pivot bearing.

Drive arrangements which eliminate the above-mentioned undesirable vibrations are shown in FIGS. 2 and 3. For example, as shown in FIG. 2, a crankshaft 201 is provided for the connection, in pairs, of four connecting rods 211, 212, 213 and 214 forming a group 200. If each one of these connecting rods is connected to a conveying trough in the manner shown in FIG. 1, two conveying troughs connected to rods 213 and 214 in a first subgroup 202 operate in a push-pull, or mirror-image symmetrical, manner with the other two conveying troughs connected to rods 211 and 212 in a second subgroup 203.

As shown in FIG. 3, six connecting rods 215, 216, 217, 218, 219 and 220 are provided as a group 300 and the associated crankshaft 310 is provided with six cranks for these six connecting rods. If here each connecting rod works with one conveying trough, two sets of three rods each operate in push-pull pairs in the subgroups 301 and 302, so that here again no shocks can be generated.

It has been found that with these two drive systems, i.e. the system of FIG. 2 employing four cranks and the system of FIG. 3 employing six cranks, practically all conveying widths required in the manufacture of baked goods can be handled, particularly if it is additionally considered that if three or five conveying paths, or troughs, are provided, a compensatory mass can be attached to one connecting rod or directly to the crankshaft. It is then possible to provide any desired number of conveying troughs between 3 and 12 or more, as follows:

| Number of Drive Units | Number of Conveying Troughs |
| --- | --- |
| 4 crank drives | 3 or 4 |
| 6 crank drives | 5 or 6 |
| 2 × 4 crank drives | 7 or 8 |

-continued

| Number of Drive Units | Number of Conveying Troughs |
| --- | --- |
| 4 + 6 crank drives | 9 or 10 |
| 2 × 6 crank drives | 11 or 12 |

Larger numbers of conveying troughs can easily be operated according to the given scheme. For example, FIG. 3 additionally shows part of a further subgroup 303 having an associated crankshaft 311.

The crankshafts may be made insertable or a separate gear box may be provided for every crankshaft and the connection between two crankshafts 310, 311 would then have to be effected via a coupling element 320. Since each one of the two illustrated drives by itself operates without vibration, it is also possible to provide a separate drive motor for each group of four or six crank drives. Coupling element 320 can be of any known type for connection together of two shafts; element 320 can, for example, be a universal joint. With two separate crankshafts 310, 311, the three subgroups 301, 302 and 303 could be driven by a single drive motor.

While bent crankshafts are shown in FIGS. 2 and 3 for the sake of explanation, it is of course left to the discretion of every person skilled in the art to utilize cranks in the form of eccentrics mounted on an otherwise linear shaft, particularly since the conveyance of cookies requires an amplitude of between 3 and 10 mm at a shaft speed of 1000 to 3000 rpm, i.e. a vibration rate of 16–50 Hz. Typical conveying troughs are generally up to 3 m long and have a width between 40 and 100 mm.

It will be understood that the above description of the present invention is susceptible to various modifications, changes and adaptations, and the same are intended to be comprehended within the meaning and range of equivalents of the appended claims.

What is claimed is:

1. In a vibratory conveyor composed of a plurality of parallel side-by-side vibratory conveying troughs for transporting fragile articles, the improvement comprising conveyor drive means composed of a rotatable drive shaft and at least one group of at least four drive elements each connected to undergo oscillatory movement in response to rotation of said drive shaft, with each said trough being connected to only one respective drive element to undergo vibratory movement in response to rotation of said drive shaft, with said drive elements of said group being arranged in two equal subgroups bearing a mirror image configuration to one another relative to a plane normal to the axis of rotation of said drive shaft, and with said drive elements of each said subgroup being connected to said drive shaft in such a manner that their respective oscillatory movements are uniformly offset in phase from one another.

2. Arrangement as defined in claim 1 wherein said drive shaft is a crankshaft and said drive elements are connecting rods connected to said crankshaft.

3. Arrangement as defined in claim 2 wherein said crankshaft is provided with four or six cranks.

4. Arrangement as defined in claim 3 wherein there is a plurality of said crankshafts each connected to a respective plurality of said connecting rods.

5. Arrangement as defined in claim 2 wherein each said conveying trough is connected to a respective connecting rod in an articulated manner.

6. Arrangement as defined in claim 5 further comprising elastic coupling elements effecting the articulated connection between said troughs and said rods.

7. Arrangement as defined in claim 1 further comprising elastic supports supporting said troughs.

8. Arrangement as defined in claim 7 wherein said elastic supports are leaf spring elements which are elastic in the direction of movement of said conveying troughs.

* * * * *